J. SCHYLANDER & P. ERICKSON.
CHECK CANCELING MACHINE OR THE LIKE.
APPLICATION FILED APR. 17, 1912.
1,162,658.
Patented Nov. 30, 1915.
8 SHEETS—SHEET 6.
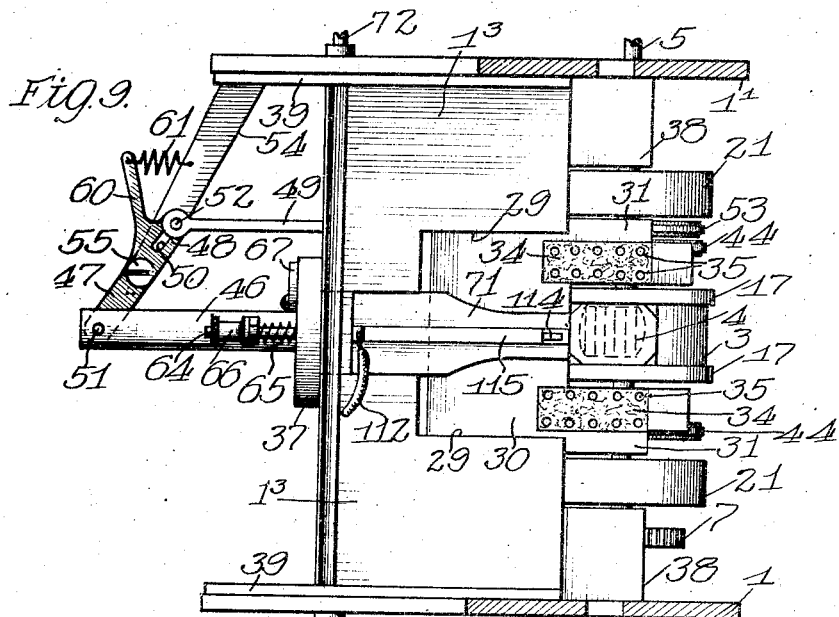
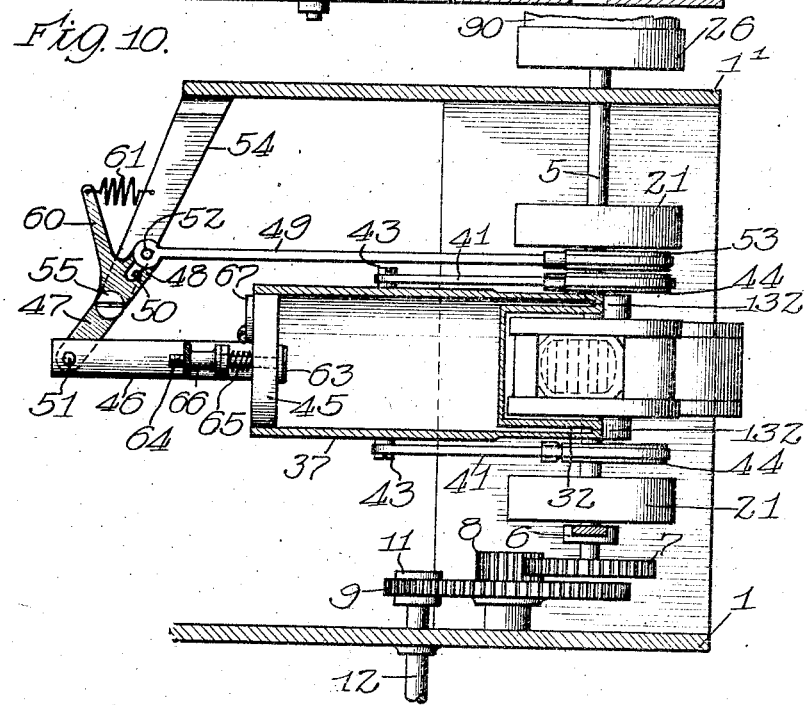

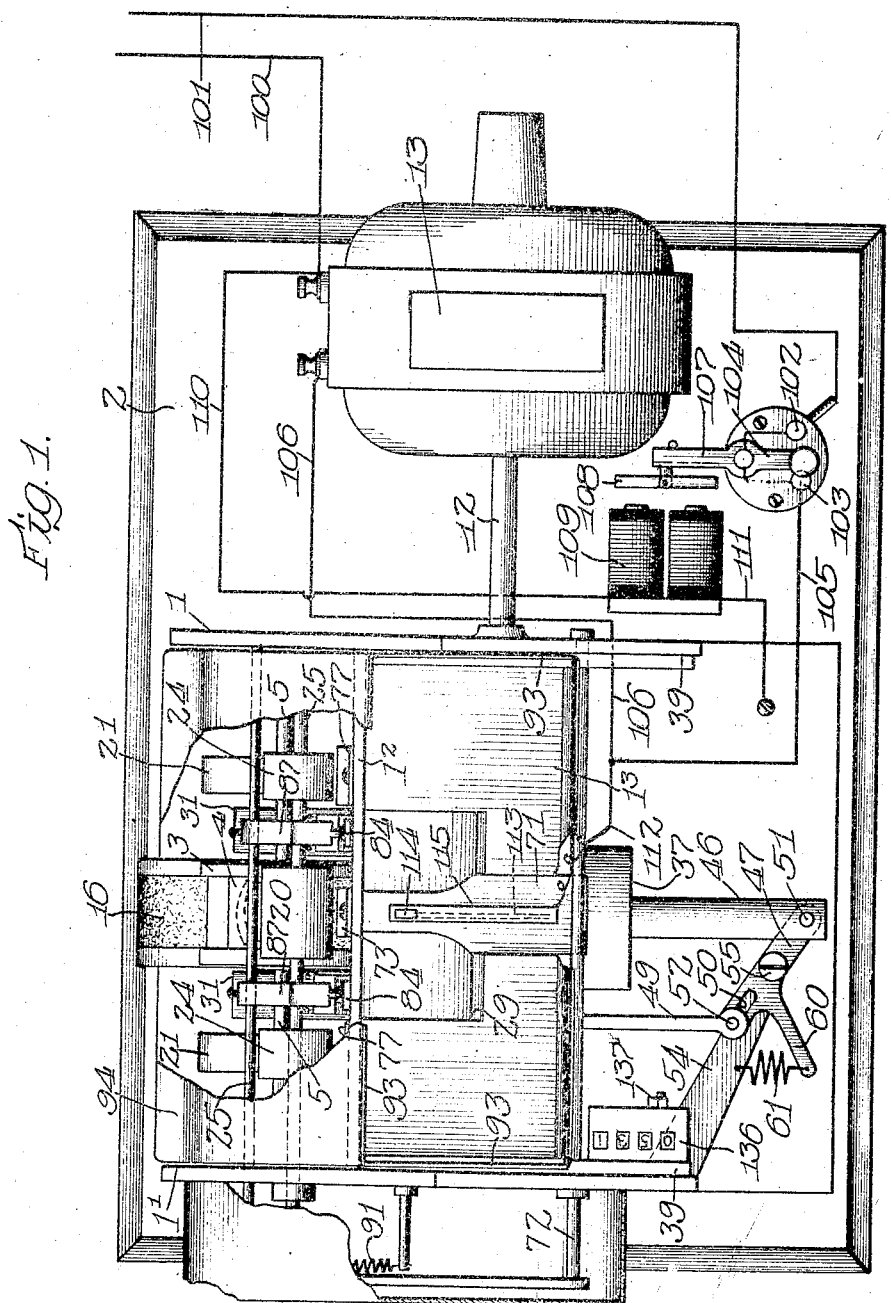

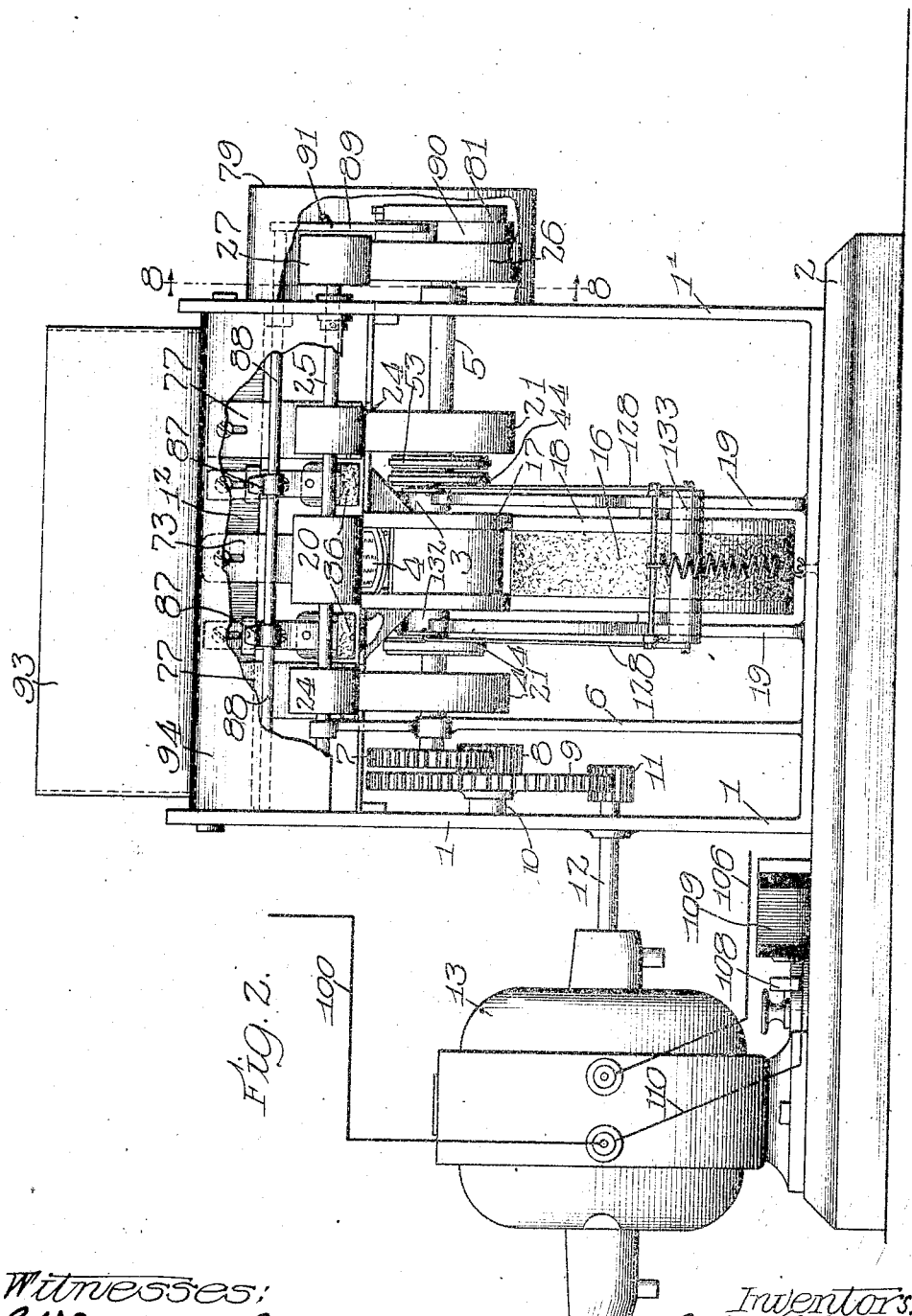

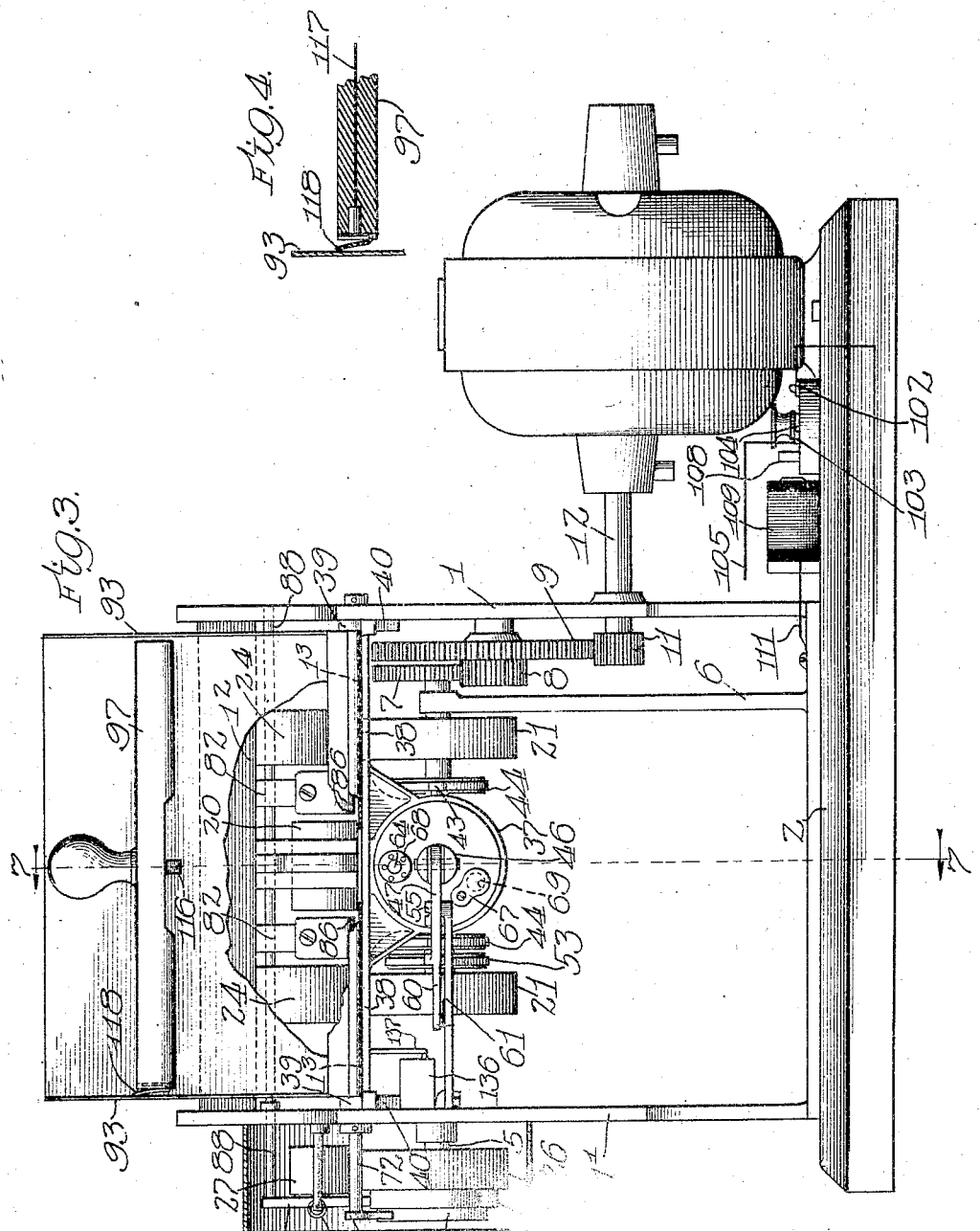

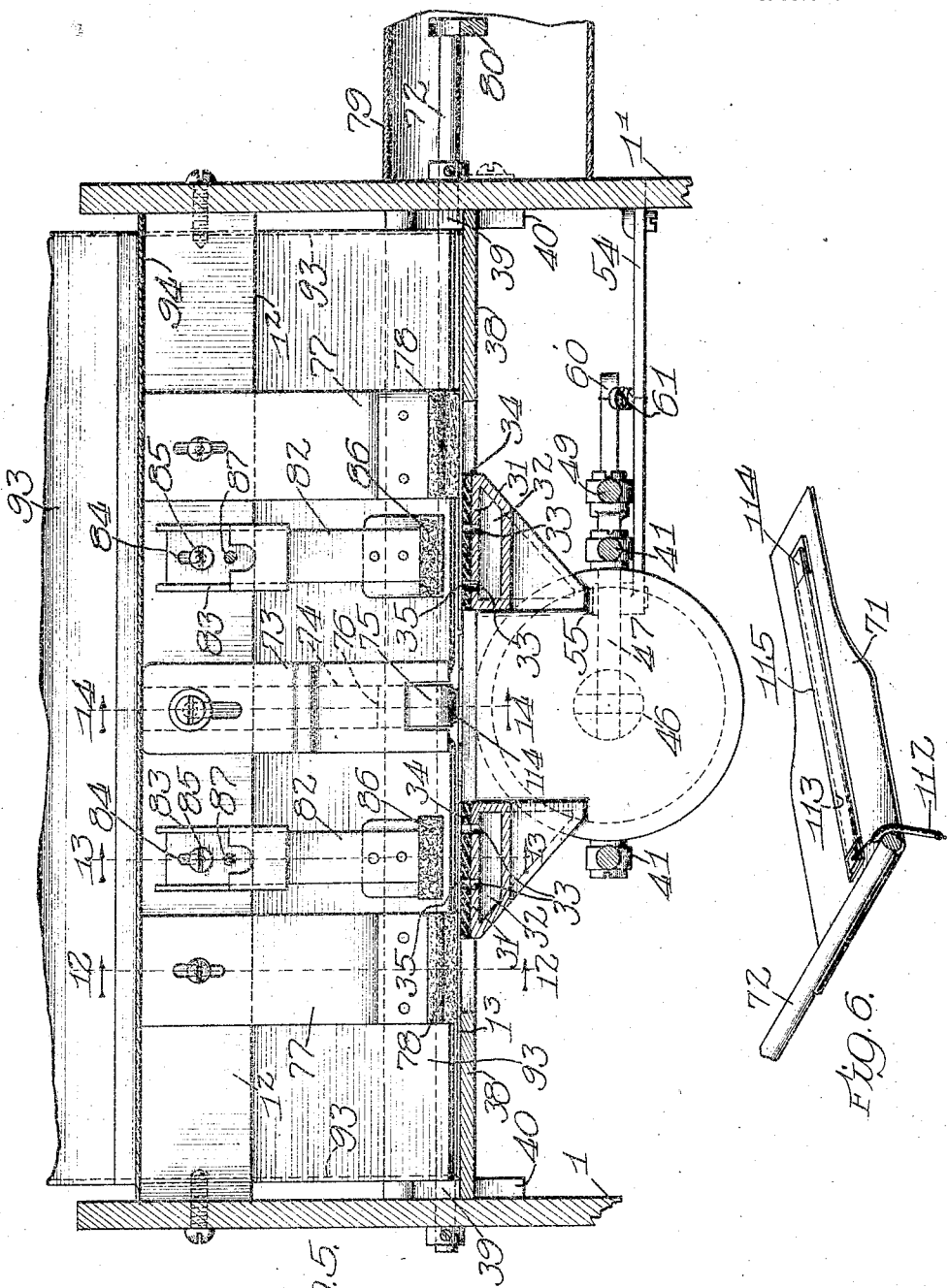

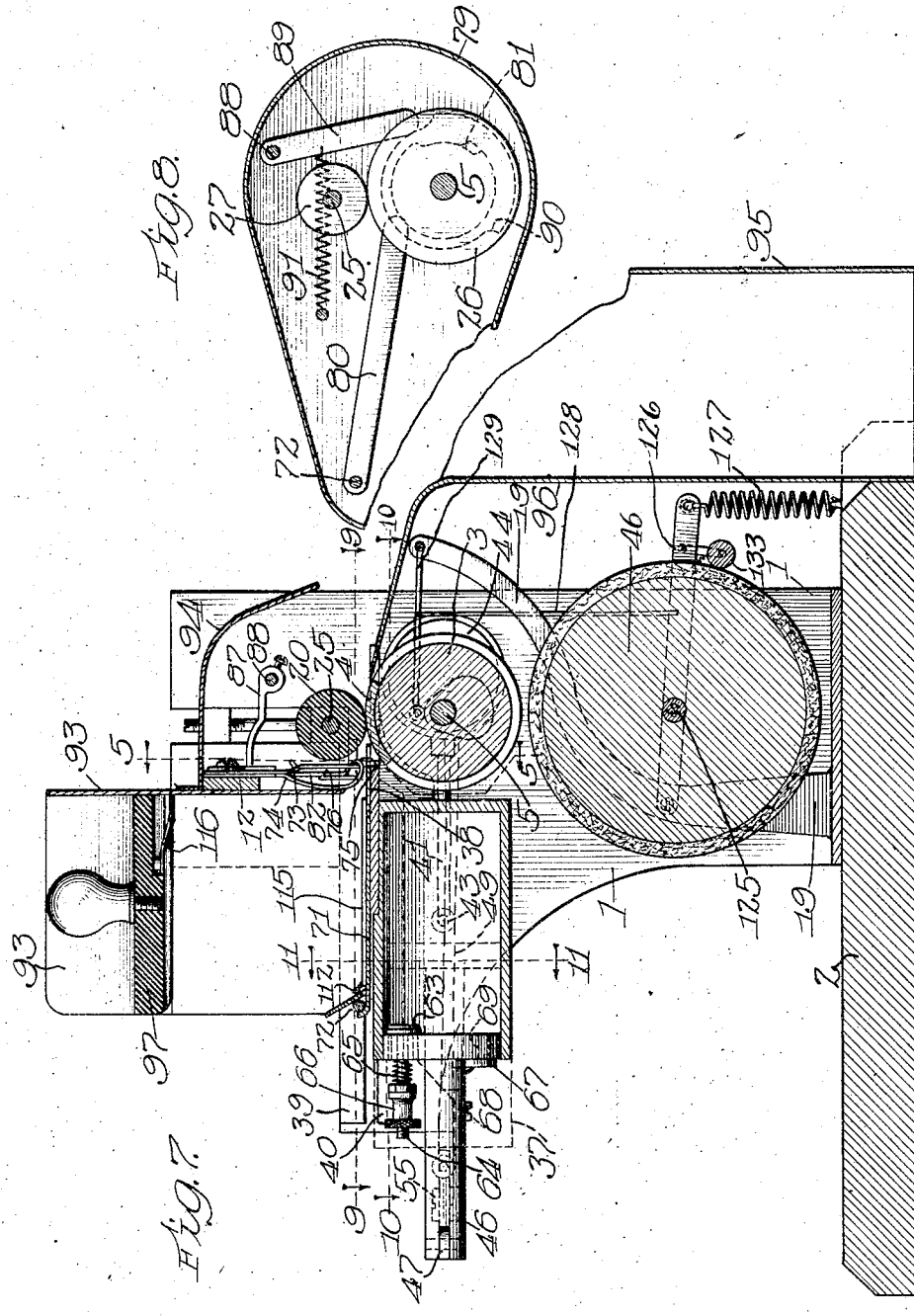

J. SCHYLANDER & P. ERICKSON.
CHECK CANCELING MACHINE OR THE LIKE.
APPLICATION FILED APR. 17, 1912.
1,162,658.
Patented Nov. 30, 1915.
8 SHEETS—SHEET 7.
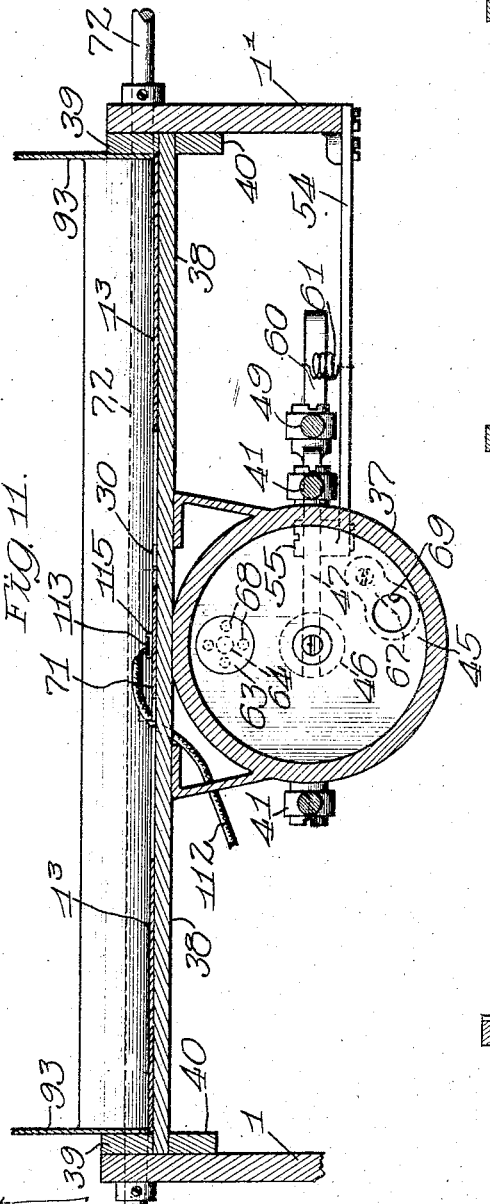
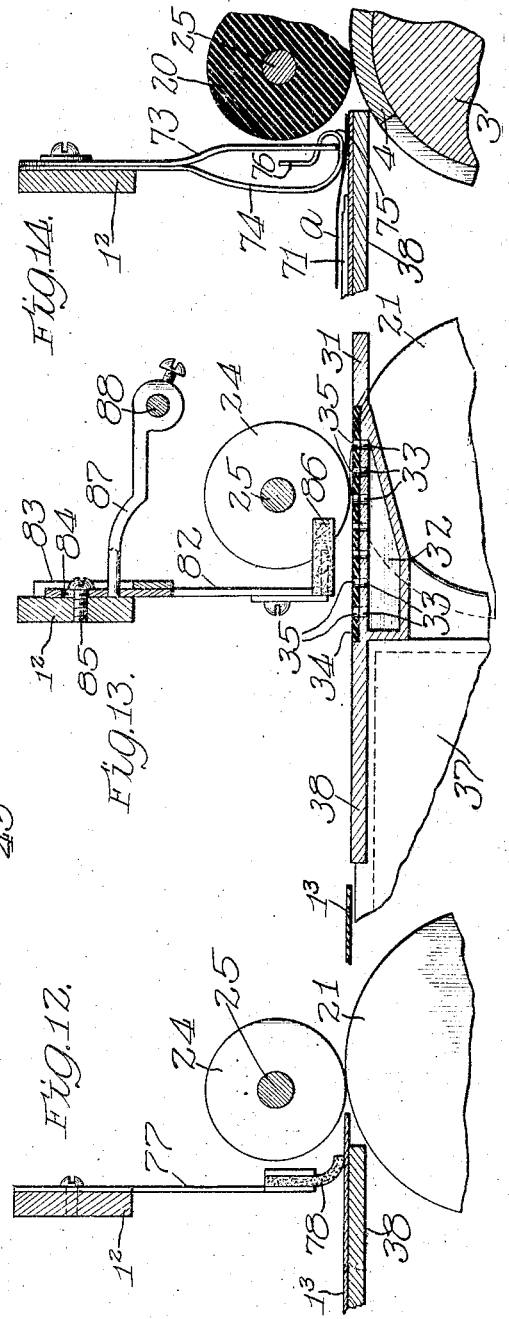

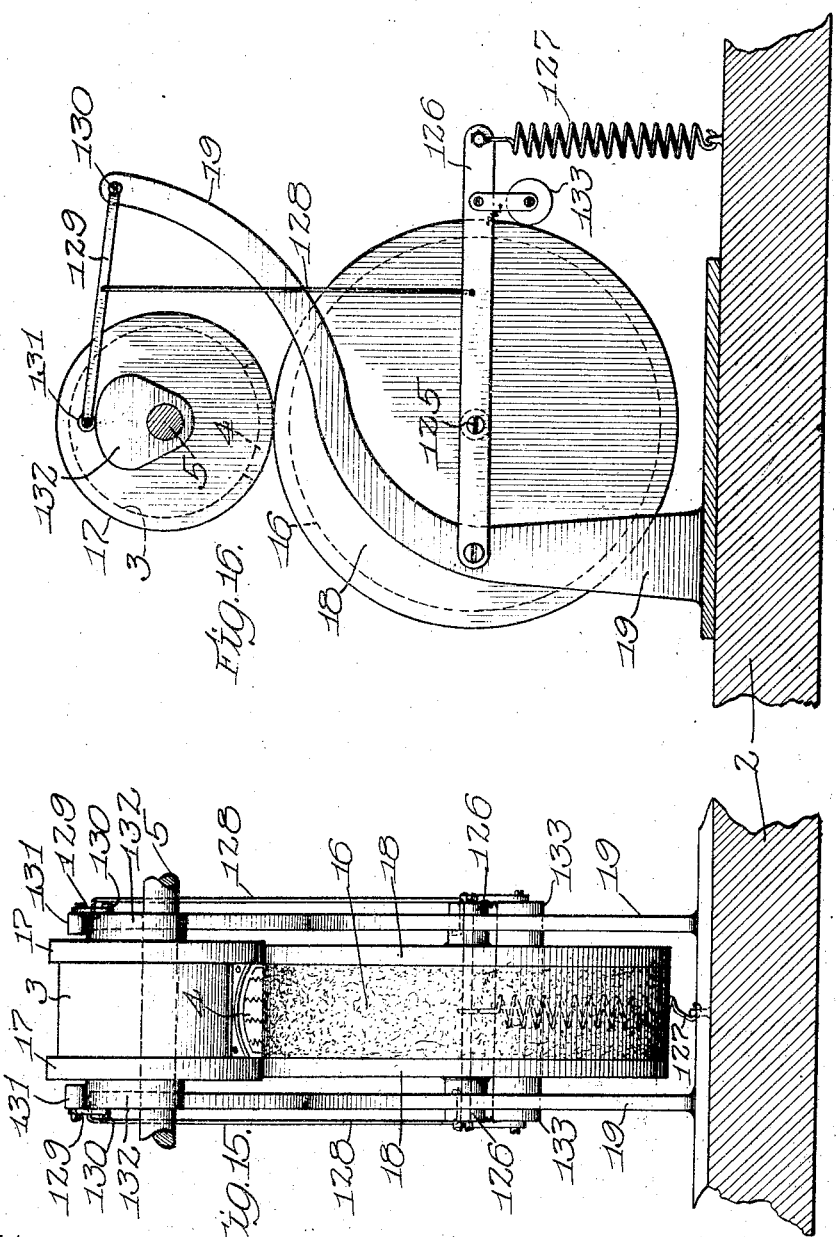

UNITED STATES PATENT OFFICE.

JOHN SCHYLANDER AND PETER ERICKSON, OF CHICAGO, ILLINOIS.

CHECK-CANCELING MACHINE OR THE LIKE.

1,162,658.

Specification of Letters Patent.   Patented Nov. 30, 1915.

Application filed April 17, 1912.   Serial No. 691,406.

*To all whom it may concern:*

Be it known that we, JOHN SCHYLANDER, a citizen of the United States, and PETER ERICKSON, a subject of the King of Sweden, residing at Chicago, in the county of Cook and State of Illinois, have invented certain new and useful Improvements in Check-Canceling Machines or the like, of which the following is a description.

Our invention belongs to that general class of devices known as check canceling or printing machines, and is particularly designed for banks and clearing houses for canceling, marking paid or indorsing checks, drafts, etc. The machine, however, is not confined to this specific use, as the same, or parts thereof, may be applied for other purposes with success and efficiency.

The invention has among its objects the production of a device of the kind described that is simple, convenient, accurate, efficient and satisfactory, and that is economical, rapid and automatic in operation.

The device does not require the constant attendance of an operator, and does the work much more rapidly than possible for an operator to do by hand; consequently the machine is both a time and a labor saving device.

To this end our invention consists in the novel construction, arrangement and combination of parts herein shown and described, and more particularly pointed out in the claims.

In the drawings, wherein like reference characters indicate like or corresponding parts, Figure 1 is a top plan view of the device with portions broken away, or removed, to more clearly show the construction. Fig. 2 is a rear elevation of the same. Fig. 3 is a front elevation of the same. Fig. 4 is a detailed view of a portion of the follower and stopping plate 97. Fig. 5 is a vertical sectional view taken substantially on line 5, 5 of Fig. 7. Fig. 6 is a detailed view of the part 71. Fig. 7 is a vertical cross-sectional view taken substantially on line 7, 7 of Fig. 3. Fig. 8 is a sectional view taken substantially on line 8, 8 of Fig. 2. Fig. 9 is a sectional view taken substantially on line 9, 9 of Fig. 7. Fig. 10 is a sectional view taken substantially on line 10, 10 of Fig. 7. Fig. 11 is a vertical sectional view taken substantially on line 11, 11 of Fig. 7. Fig. 12 is a vertical sectional view taken substantially on line 12, 12 of Fig. 5. Fig. 13 is a vertical sectional view taken substantially on line 13, 13 of Fig. 5. Fig. 14 is a vertical sectional view taken substantially on line 14, 14 of Fig. 5. Fig. 15 is a side elevation of the inking mechanism, and Fig. 16 is another view of the same.

Referring to the drawings, 1, 1¹ and 1² represent a suitable frame provided with a table or plate 1³. Arranged upon a wheel or roll 3, hereafter termed the printing roll, is a printing plate 4 bearing any suitable characters, the characters, of course, depending upon what is to be printed, printing being the method of canceling illustrated. The roll 3 is mounted upon and driven by a shaft 5, supported in any suitable manner, as shown by the frame part 1¹ and a bracket 6. The shaft 5 may be driven in any desired manner, as shown it is provided with a gear 7, which is driven by pinion 8 upon the shaft 10, to which is also secured a gear 9. The gear 9 is driven by a pinion 11 arranged on a shaft 12, which is driven by an electric motor 13, or an equivalent source of power. An electric motor is very satisfactory and preferred for the purpose, as it may be controlled as hereafter described in a very simple manner.

The printing plate 4 may be inked in any manner found desirable, a very simple and satisfactory method being to provide an inking roller 16. In order to change the inking, or that is where the type meets the ribbon or inking pad, we make the wheel 16 of greater or less diameter, whichever may be preferred, and drive the same by providing flanges 17 upon the printing roll 3 and 18 upon the inking roll 16.

As most clearly shown in Figs. 2, 7, 15 and 16, mechanism may be provided whereby the inking roll will be brought into contact with the printing plate only when the plate is in position to be inked, the same being out of contact at other times. Referring particularly to Fig. 15, a very simple mechanism for doing this is shown, and consists of suitable cams arranged on the shaft 5, and coöperating means for supporting the roll so that it is raised or dropped at the desired time. The inking roll 16 is pivotally supported at 125 to bars or arms 126, which are pivotally carried by brackets 19 on the frame. Also carried from the brackets 19 are arms 129, which may be pivotally secured to the brackets at 130, and are provided with rolls 131, or their equivalents, arranged to rest upon the cams 132. The arms 126 and 129 are connected by connecting bars 128. As is obvious, as the free ends of the arms 129 are raised, they raise the free ends of the arms 126, thereby raising the inking roll 16, so that it contacts with and inks the printing roll plate. It is understood, of course, that the cams 132 are so arranged upon the shaft and so proportioned that the roll 16 is raised and lowered at the proper time. If desired, the arms 126 may be maintained down by springs 127 or their equivalent. Ordinarily, however, the weight of the roll 16 is sufficient to draw the roll and arms down so that the roll is not in inking contact with the printing roll or plate. Any suitable means may be employed for preventing the roll 16 from rotating or spinning when not in contact with and driven by the printing roll. As shown, a small friction roller 133 is provided and so adjusted that it will prevent the roll 16 from running free, but permit its movement when in inking contact with the printing roll 3.

We have not shown in the drawings any particular printing plate, it being understood that any plate suitable for the purpose may be employed, and where the machine is used for canceling checks or the like by printing, where it is desired to date the same, removable dating or other type (not shown) may be provided. It is, of course, understood that additional printing rolls 3, bearing any desired information to be printed, may be provided, so that the rolls may be interchanged, the printing rolls in this case being preferably made removable from shaft 5.

To maintain the paper against the printing roll 3, a roller 20 mounted upon a shaft 25, is provided, which shaft may be driven from the shaft 5 by the friction rolls 26 and 27, or their equivalents for the purpose. To feed the paper between the printing roll 3 and the roll 20, it being understood that the printing roll and roll 20 to a certain extent feed the paper after it has been gripped by them, additional rolls 21 and 24 are provided, the same being secured to the shafts 5 and 25 respectively.

For automatically feeding the paper to where it will be engaged by the feeding rolls previously mentioned, we preferably employ a movable or reciprocating carriage 30, provided with a suction top that will take the lower sheet of paper, or the lower check, and carry the same to where it will be gripped by the rolls. Referring particularly to Fig. 1, the table or plate 1ª is cut out at 29, and below the table is arranged the movable carriage 30 having extended ends 31, which ends are preferably formed with chambers 32 therein (see Fig. 5). The upper face of the extended ends 31 are provided with openings 33, and upon the face of the plate or end are mounted preferably rubber faces 34 having openings 35 registering with the openings 33. The paper above mentioned is maintained upon the movable carriage by causing a suction or partial vacuum in the chambers 32 at each side of the carriage. The suction may be from any source, a very convenient construction being a pump, which is carried by the carriage. The pump shown comprises a pump cylinder 37 and a coöperating plunger or piston 45. As most clearly shown in Fig. 10, the pump cylinder 37 and the piston 45 travel in opposite directions, both being movable, so that the pump is double acting when traveling toward the printing roll. The pump cylinder 37 is secured to a plate 38, which also carries the movable carriage, the plate being supported and guided at each side of the machine by the brackets 39 and 40. The cylinder 37 is provided with rods 41 pivotally secured thereto at 42, which rods are actuated by eccentric or cams 44 (see Fig. 7) arranged upon the shaft 5. As is obvious, as the shaft is rotated, the pump cylinder 37 is reciprocated upon the guides 39, 40. The piston 45 is provided with a piston rod 46, which is pivotally connected at 51 to an arm 47, having an extended part 48. The rod 47 or arm is pivotally supported at 55 by a bracket 54, or its equivalent. To the end 48 of the arm 47 is secured a connecting rod 49, which is actuated by an eccentric or cam 53 on shaft 5. The rod 49 is preferably connected to the end 48 by a slot and pin connection, 52 being a pin arranged to extend through the slot 50 in the end of the arm. As the shaft 5 is rotated, reciprocating the pump cylinder, it reciprocates the piston at the same time, but in the opposite direction.

It may be mentioned that the eccentric or cam 53 for operating the rod 49 is preferably so arranged or proportioned that the piston 45 has a slight initial or accelerated movement before the cylinder 37 moves toward the printing roll, so that there is a partial suction at the time the carriage starts toward the printing roll, and the lower sheet will be taken along at once.

We have not endeavored to show the parts in different or changed positions, as it is believed the same are so clearly shown in the drawings that views showing the changed positions are unnecessary.

In Figs. 1 and 3 we have shown a recorder or counter 136. The counter 136 is shown only to illustrate the use of the same, and not to indicate any particular form of counter. As shown, the counter 136 is provided with an arm 137, so that each time that the carriage returns, it moves the arm, causing the recorder to indicate that the carriage has made a trip to the printing rolls. Any form of recorder or counter may be used, and the same may be actuated by any of the moving parts of the mechanism so as to accomplish the results sought for. The great advantage of having a counter or recorder on is to indicate or count the number of checks, or other articles passing through the machine when used for canceling, or where the feeding mechanism is employed for any other purpose.

The plunger 45 may be provided with a valve 63 arranged to control the openings 68 in the plunger. The valve 63 is provided with a stem 64, and is normally maintained upon its seat by a spring 65, or the equivalent, arranged between the plunger and an adjustable nut 66. The purpose of the valve 63 is to serve as a safety valve so that if the suction of the pump becomes greater than desired, it will be relieved by the operation of the valve, the nut 66 and spring 65 permitting adjustment so as to afford or permit the desired suction. One of the parts, as shown the plunger, is provided with a port 69 (see Fig. 7) which is normally covered by a valve 67, which may be constructed of rubber, or the equivalent. The purpose of the same is to permit the escape of air when the cylinder and plunger are moving toward each other, so that all of the air need not necessarily pass through the openings 33, 35, as the carriage is retrieved. If desired, the arm or part 48 may be extended as at 60, and the free end secured to the support 54 by a spring 61, or its equivalent. The purpose of the spring 61 is to assist in retrieving the plunger, or that is while the plunger and cylinder are moving in opposite directions or the carriage carrying paper to the printing roll and assists the plunger in its initial movement previously mentioned.

Arranged upon the table 1³ (see Figs. 1 and 6) is a movable member 71, for the purposes hereafter described, the same being secured to a shaft 72, which is rocked in any desired manner. As shown, arranged within the casing 79 is an arm 80, which is secured to the shaft 72. Upon the shaft 5 is arranged a cam 81, the same being formed so as to slightly raise the arm 80 and rock shaft 72, thereby raising the member 71.

Carried by the frame part 1² (see Fig. 14) is a depending part 73 and a depending spring 74, which is preferably formed as at 75 so as to form a resilient foot, the end of the same being extended up as at 76. The purpose of the foot 75 and part 73 will be more fully explained in the operation of the device.

Arranged proximate the rollers 24 and carried by the frame 1² (see Fig. 12) are depending arms 77 provided with feet 78, preferably of rubber or equivalent material. The purpose of these will also be more fully explained in the operation of the device.

Carried by the frame 1² (see Fig. 13) above the extended parts 31 (see Fig. 5) are vertically movable arms 82. The vertically movable arms 82 are guided by plates 83 secured to the frame part. A screw 85 extending through the slot 84 in the arm 82 limits the travel of the arm 82. Each arm 82 is provided with a suitable foot 86 of rubber, or equivalent material. The arms 82 are raised and lowered by arms 87 arranged upon a rock shaft 88. The shaft 88 may be rocked in any suitable manner, as shown (referring particularly to Figs. 2 and 8) the rock shaft 88 is provided with an arm 89 arranged to coöperate with a cam 90 in casing 79 and secured to the shaft 5.

Arranged above the table 1³ is a receptacle 93, which is preferably provided with an extended part 94 arranged to cover the mechanism previously described (see Fig. 7). There is also preferably provided a receptacle 95, having an extended part 96 adapted to fit in proximity to the printing roll 3, so that as the paper is fed through the machine, it will drop into the receptacle 95, and be easily collectible. Arranged within the receptacle 93, and vertically movable therein, is a follower 97, the purpose of the same being to press down upon the top check or paper and feed the same downward. The same also acts as a control and closes the circuit to shut off the motor (as later described), when the last sheet of paper is out and the traveler rests upon the table 1³.

The preferred motor control is most clearly shown in Figs. 1, 3 and 6, in which 100 and 101 represent the feed wires for the motor 13, one of the feed wires, as shown 100, being connected to one of the binding posts of the motor. The other feed wire 101 is connected to a contact member 102, forming part of a suitable switch, the same being connected to a switch bar 104. The switch is also provided with a contact 103 arranged to coöperate with the switch bar 104. The contact 103 is connected by conductors 105 and 106 to the other binding post of the motor. When the switch is thrown to contact with contact 103, an electric circuit is closed through the motor, thereby starting the same, and it continues to run until the circuit is broken. To automatically shut off the motor when the last sheet of paper has been fed through the machine, so that an operator is not required to continually watch the machine, means for automatically operating the switch bar 104 is provided. As shown, the switch bar is provided with an extended end 107 to which is secured the armature 108 of a coil 109. The coil 109 is connected by conductor 111 to the machine, or that is grounded and also connected by conductor 110 to the proper binding post of the motor. The conductor 105 is connected by conductor 112 to a conductor 115 upon the member 71. The conductor 115 is connected to a contact 114, the conductor 115 and contact 114 being suitably insulated from the member 71 and the frame. Secured to the follower 97 is a contact member 116 arranged to contact with the contact 114 when the last sheet has been fed out and the follower rests upon the table. The contact member (see Fig. 5) 116 is connected by a conductor 117 to a contact member 118 arranged to contact with the receptacle 93, forming a ground, so that when the follower is down, a circuit may be traced from 105 through 112, 115, 114, 116, 117, 118, through the machine 111, through the coil and 110 to binding post or feed conductor 100. As soon as the coil 109 is energized it draws the armature 108 to it, thereby moving the switch part 104 off of the contact 103, thereby breaking the circuit, and stopping the motor.

The operation of the machine when used for canceling checks, may be briefly described as follows: Assuming that the receptacle 93 is supplied with the matter to be canceled, checks for instance, the same extending from the carriage and table up to and supporting the follower 97 (see Fig. 7). As shown, the carriage is substantially at the end of its travel toward the printing roll, it being understood, however, that its position may vary at the stopping of the machine. Taking, however, the parts as shown for illustration, the switch 104 is closed so that the motor is driven as previously described. Starting the motor drives the shaft 5, the printing roll, and the eccentrics operating the cylinder and plunger. The carriage moves away from the printing roll with the cylinder 37, and at the same time the plunger 63 is forced into the cylinder. The valve 67 previously described may open, permitting the escape of any air from the cylinder, and preventing compression. A portion of the air may escape through the small holes 33, 35. After the carriage has reached the end of its travel it starts back toward the printing roll, the plunger preferably having a slight advance or accelerated movement, as previously described, to suck the lower sheet upon the carriage. As the parts move toward the printing roll, the plunger is at the same time withdrawn from the cylinder, creating a suction or partial vacuum in the cylinder. This causes the bottom sheet of paper, which we may for convenience call sheet one, resting upon the table 1³ and carriage 80, to be carried with the carriage toward the printing roll. Just after the initial movement of the carriage the shaft 88 permits the arms or feet 82 to drop so that their feet 86 bear down upon the sheet of paper being carried (sheet one), and remain down until just previous to the time the carriage starts on its return. The same does not bear down upon the paper enough to prevent its being carried through the machine, but enough to hold it firmly upon the suction plate. The stationary feet 78 maintain the ends of the checks or paper upon the table, so that the same will pass through and between the rolls 21 and 24. As the paper reaches the resilient foot 75 (that is the lower sheet one, or the one being carried) the resilient foot pushes down the edge of the sheet so that it passes by or under the lower edge of the foot 73. The second sheet, however, (sheet two) or the one immediately above the one being carried, is maintained slightly up by the member 71, so that its edge engages the lower end of the foot 73, and is prevented from sliding or being carried with the lower sheet. The parts are preferably so arranged that the part 71 raises just after the feet 82 drop, so as to slightly raise the edge of sheet two, so that the same engages with 73, and drops again just after the start of the carriage from the printing roll. By lifting the edge of the second sheet, only one sheet is carried at a time. It will be noted that the resilient foot 75 (see Figs. 5 and 14) extends slightly below the part 73, so as to turn down the bottom sheet of paper, as indicated in Fig. 14 by $a$, as soon as the same is carried. However, 75 is resilient enough to raise or give so that sheet two is engaged at 73 and not carried. The lower sheet is carried to a point where it is engaged or gripped by the rolls 3 and 20 and 21 and 24, and canceled or printed and drawn through the machine and dropped into the receptacle 95. When the lower sheet (sheet one) has been taken hold of or gripped by the rolls, the carriage starts back to get the next sheet, which we have previously mentioned as sheet two, which is now the lower sheet. The operation is continued until the machine is stopped.

If the recorder or counter is attached, the number of sheets passing through the machine may be readily determined. As the paper is fed out of the receptacle 93 the follower 97 carried or supported thereby lowers until the last sheet is drawn out, when it rests upon the table 1³. At this time, however, the contact 116 rests upon the contact 114 (see Fig. 1) and the circuit is immediately closed, as previously described, energizing the electro-magnet coil 109 and operating the switch 104 to break the circuit, and the machine immediately stops.

It will thus be seen that the invention broadly consists of suitable receivers or receptacles, and with means for carrying or transferring the paper or equivalent from one receiver to the other, and canceling means arranged to cancel the paper while they are being carried.

While we have mentioned canceling, and referred particularly to canceling checks, it is, of course, understood that these may be canceled either by printing, as described, or otherwise, placing identifying marks or characters upon the paper, which may or may not be checks. In fact, where the counter is employed, the checks or the equivalent, may be carried from one receptacle to the other and counted without any printing or canceling, by merely throwing the printing mechanism out of operation, as for example, by disconnecting the inking roll, removing the printing roll, or in an equivalent manner.

Having thus described our invention, it is obvious that various immaterial modifications may be made in the same without departing from the spirit of our invention, hence we do not wish to be understood as limiting ourselves to the exact form, construction, arrangement, or combination of parts herein shown and described, or uses mentioned.

What we claim as new and desire to secure by Letters Patent is:—

1. In a device of the kind described and in combination, a suitable frame, printing mechanism carried by said frame, comprising a printing roll, means for maintaining the paper to be printed in operative relation to said roll, means for inking said roll, a paper support, means arranged at said support and movable beyond the printing roll below the papers supported thereby for feeding the paper to be printed to said roll, means coöperating therewith for slightly raising the edge of the next adjacent sheet, and means for engaging the edge of said second sheet.

2. In a device of the kind described and in combination, a suitable frame, printing mechanism carried by said frame, comprising a printing roll, means for maintaining the paper to be printed in operative relation with said roll, means for periodically inking said roll, a support for a stack of paper, and means for feeding the paper to be printed in said stack to said roll singly sheet by sheet from the bottom of the stack, including means coöperating therewith for slightly raising and engaging the edge of the sheet adjacent to the one carried.

3. In a device of the kind described and in combination, a canceling mechanism, means for carrying the paper to said canceling mechanism, said means positioned below the paper, means for slightly raising, and means for engaging the edge of the sheet of paper adjacent to the sheet carried, and means for carrying the paper through said canceling mechanism.

4. In a device of the kind described and in combination, a canceling mechanism, means for supporting a stack of paper to be canceled in proximity to said canceling mechanism, means for carrying the paper singly sheet by sheet from the bottom of the stack to said canceling mechanism, means for carrying the paper through said canceling mechanism, and means coöperating with said carrying mechanism for engaging the sheet adjacent to the one carried, means for depressing the edge of the carried sheet to clear said engaging means, and means for slightly raising the edge of the adjacent sheet to engage said engaging means.

5. In a device of the kind described and in combination, a suitable frame, canceling mechanism comprising a printing roll provided with a printing plate, coöperating means for retaining the paper to be printed in operative relation with said printing roll, means for periodically inking said roll, means for carrying the paper through said printing roll and said coöperating retaining means, a paper receptacle, means for carrying the paper sheet by sheet from the bottom to said receptacle to said printing roll, a positively actuated mechanism for engaging the edge of the sheet of paper adjacent to the carried sheet after a predetermined movement of said canceling means, a paper receptacle for receiving said printed paper, and means for operating said printing roll and said paper carrying mechanism.

6. In a device of the kind described and in combination, a suitable frame, canceling printing mechanism, comprising a printing roll provided with a printing plate, means for retaining the paper to be printed in operative relation with said printing roll, means for inking said roll, means for carrying the paper through by said printing roll and its coöperating roll, a paper receptacle, means for carrying the paper sheet by sheet from the bottom of said receptacle to the printing roll, comprising a movable carriage having its end forked and arranged to extend past each end of the printing roll, said carriage provided with a suction chamber having openings to the exterior at the top face thereof, means arranged above the carriage for maintaining the carried sheet of paper in contact therewith, and means for engaging the edge of the next superimposed sheet of paper and preventing the carrying thereof, a paper receptacle for receiving said printed paper, means for operating said printing roll and paper carrying mechanism, and means for automatically stopping said operating means after said first mentioned paper receptacle has been emptied.

7. In a device of the kind described and in combination, a suitable frame, canceling printing mechanism, comprising a printing roll provided with a printing plate, means for retaining the paper to be printed in operative relation with said printing roll, means for periodically inking said roll, means for carrying the paper through by said printing roll and its coöperating roll, a paper receptacle, means for carrying the paper sheet by sheet from said receptacle to the printing roll, means for engaging the paper adjacent to the carried sheet, means for maintaining the carried sheet upon the carrying means, including a plurality of movable feet, a paper receptacle for receiving said printed paper, means for operating said printing roll and paper carrying mechanism, and means for automatically stopping said operating means after said first mentioned paper receptacle has been emptied.

8. In a device of the kind described and in combination, a suitable frame, canceling printing mechanism, comprising a printing roll provided with a printing plate, means for retaining the paper to be printed in operative relation with said printing roll, means for inking said roll, means for carrying the paper through by said printing roll and its coöperating roll, a paper receptacle, means for carrying the paper sheet by sheet from said receptacle to the printing roll, comprising a movable carriage arranged below said receptacle and having an upper face provided with openings therethrough, said carriage having a suction chamber therein communicating with said holes, auxiliary means for maintaining the carried paper upon said carriage including a plurality of movable feet, a paper receptacle for receiving said printed paper, means for operating said printing roll and paper carrying mechanism, means for automatically stopping said operating means after said first mentioned paper receptacle has been emptied, and means for recording the operations of the machine.

9. In a device of the kind described and in combination, a suitable frame, a pair of paper receptacles, means for carrying the paper from one receptacle to the other, including a movable carriage, means for maintaining the paper to be carried upon said carriage, comprising suction mechanism and means auxiliary therewith for positively maintaining the carried sheet in contact with the carriage, and means for printing each sheet of paper as it is carried from one receptacle to the other.

10. In a device of the kind described and in combination, a suitable frame, a plurality of receptacles, means for carrying the paper from one receptacle to the other, said means including a movable carriage, and suction means for maintaining the paper upon said carriage, said carriage arranged below the paper to be carried, means arranged to contact with the upper side of the carried sheet and maintain the same upon the carriage after an initial movement of the carriage, and means for canceling said paper while being carried from one receptacle to the other.

11. In a device of the kind described and in combination, a suitable frame, a plurality of receptacles, means for carrying the paper from one receptacle to the other sheet by sheet, said means including a movable carriage arranged below the paper to be carried, suction means for maintaining the paper upon said carriage, and means positioned above the carriage arranged to contact with the top face of the carried sheet and positively maintain the same upon the carriage, and means for engaging the edge of the sheet of paper adjacent to the carried sheet, and means for printing said paper while being carried from one receptacle to the other.

12. In a device of the kind described and in combination, a suitable frame, a check receptacle for receiving uncanceled checks, a check receptacle for receiving canceled checks, means for specifically carrying said checks from said first mentioned receptacle to the other, including a movable carriage arranged below the receiving check receptacle, means for maintaining the lowermost check upon said carriage, means coöperating with the carriage mechanism for positively controlling said means, and means for raising the edge of an adjacent check after an initial movement of the carriage, and means for placing a designating mark on said checks during the carrying thereof.

In testimony whereof, we have hereunto signed our names in the presence of two subscribing witnesses.

JOHN SCHYLANDER.
PETER ERICKSON.

Witnesses:
 Roy W. Hill,
 Charles I. Cobb.